Feb. 22, 1938. L. J. SISLEY ET AL 2,108,999
MIXING MACHINE
Filed June 4, 1935 4 Sheets-Sheet 1
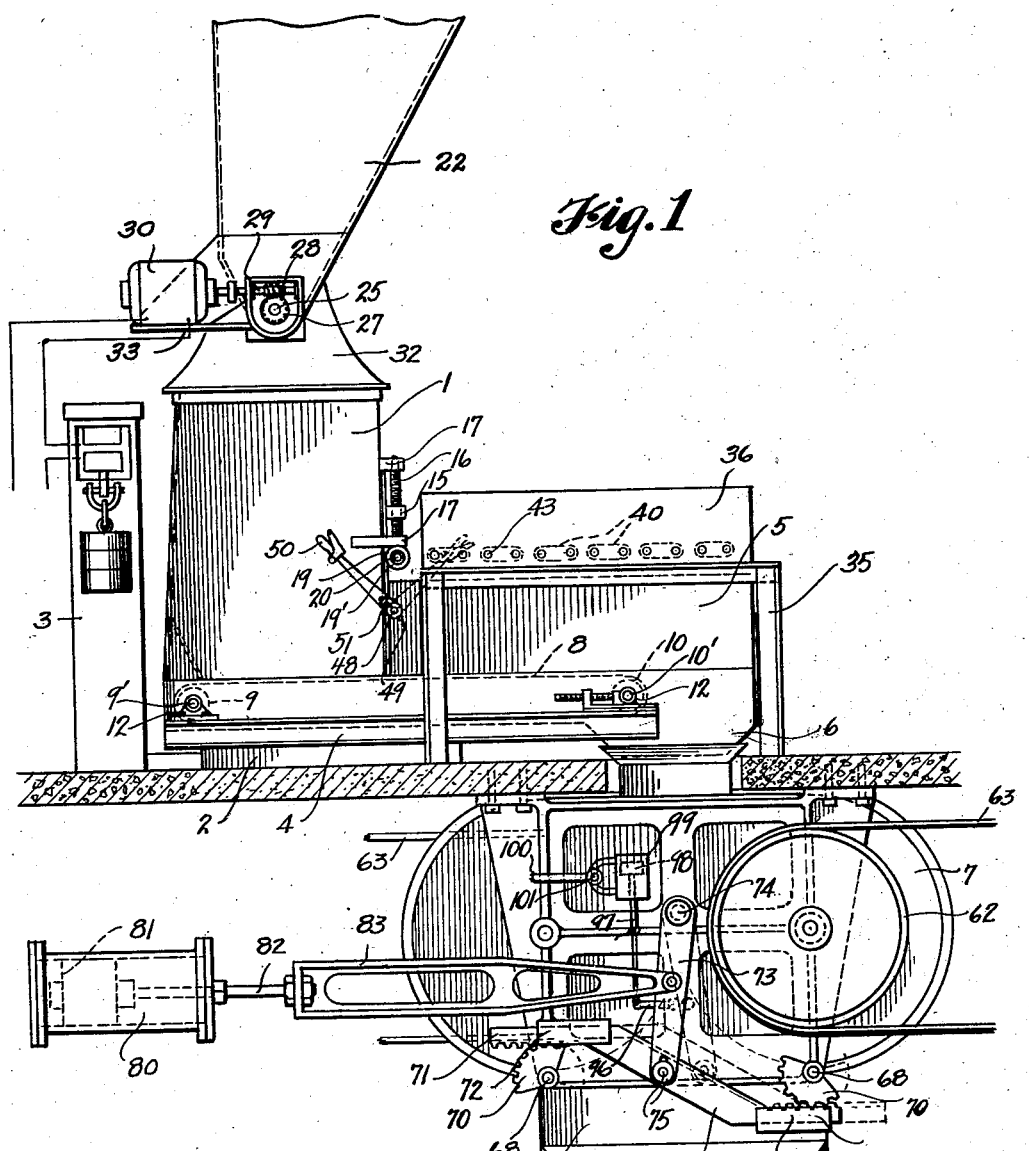

Feb. 22, 1938.  L. J. SISLEY ET AL  2,108,999
MIXING MACHINE
Filed June 4, 1935  4 Sheets-Sheet 2
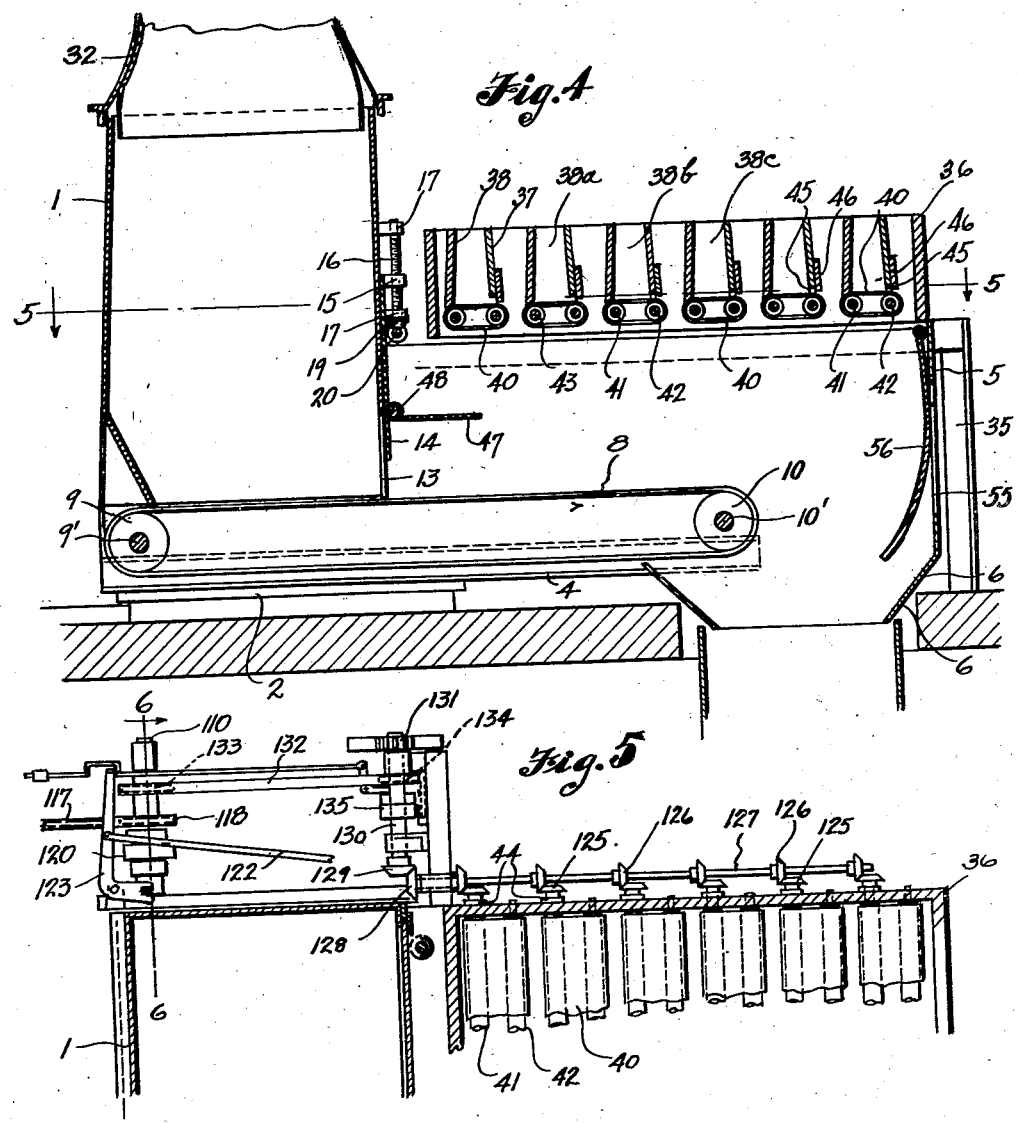
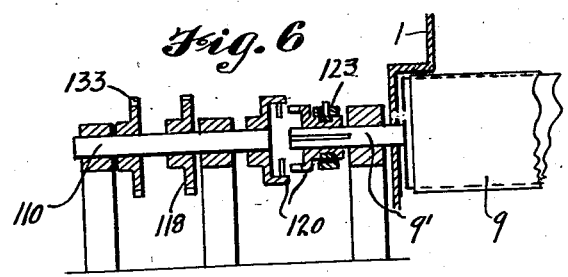
F. J. WHITE  INVENTORS
L. J. SISLEY
BY
Cook & Robinson
ATTORNEY

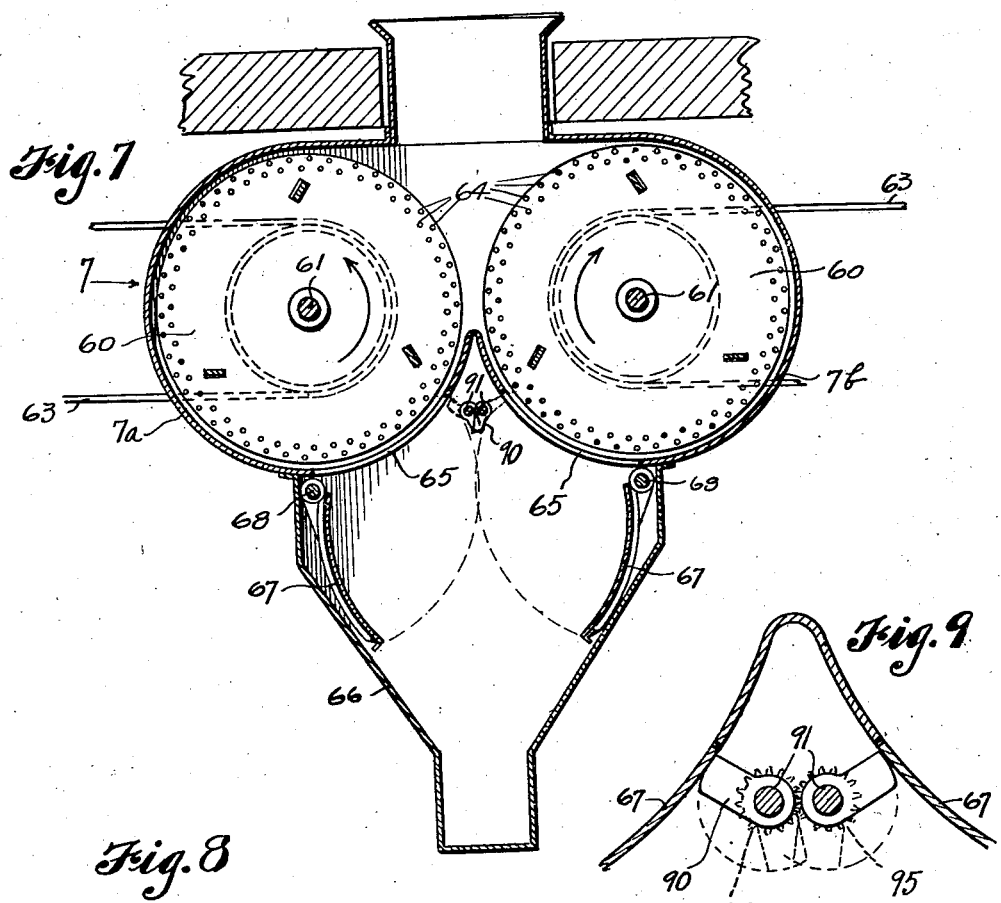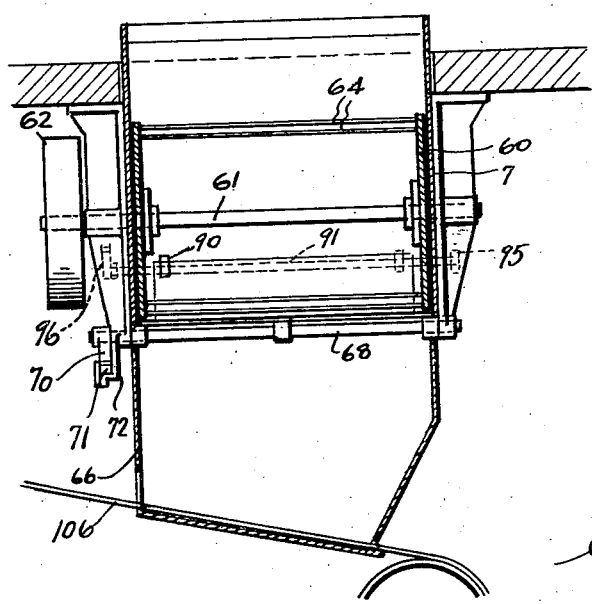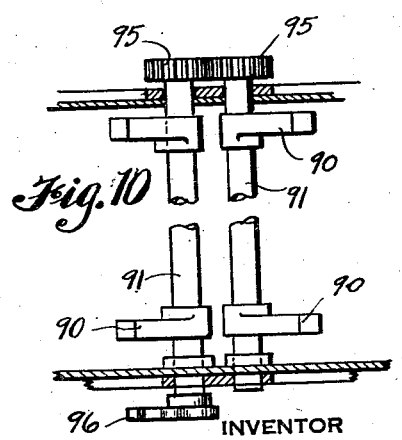

Feb. 22, 1938.  L. J. SISLEY ET AL  2,108,999
MIXING MACHINE
Filed June 4, 1935  4 Sheets-Sheet 4
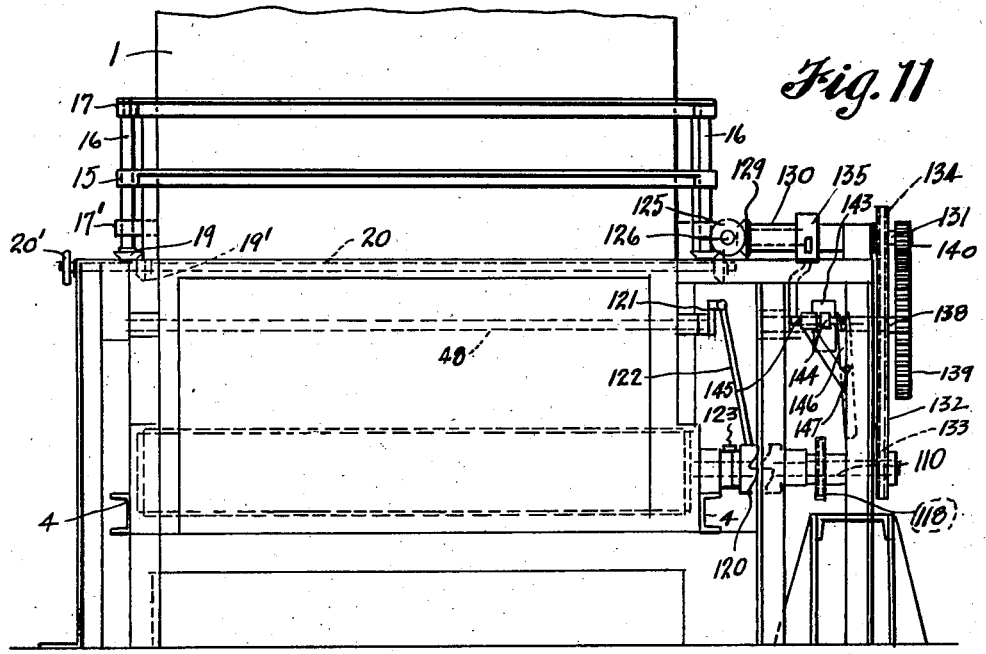
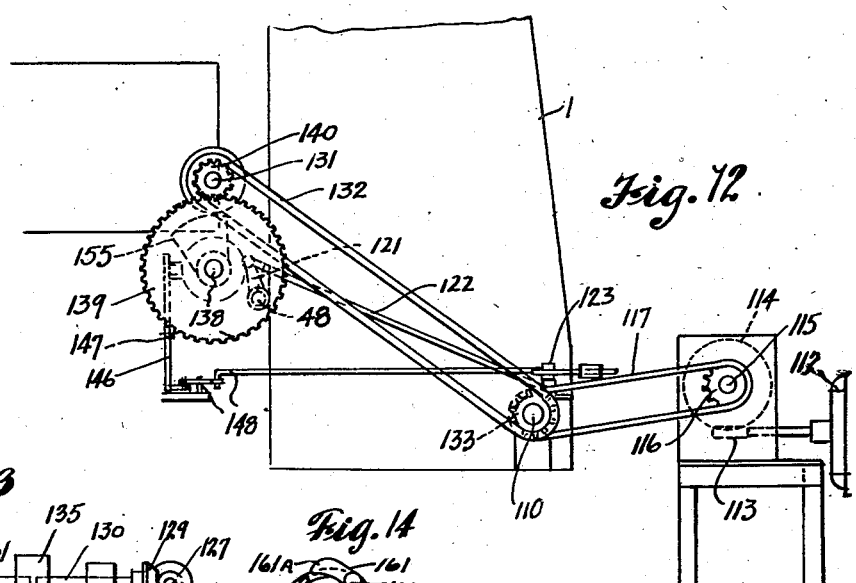
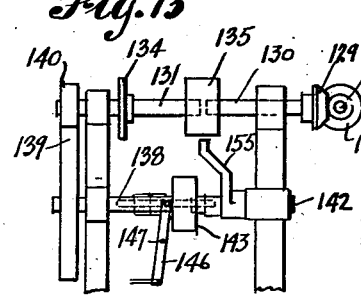
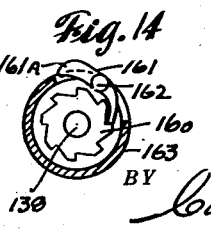
INVENTOR
L. J. SISLEY
F. J. WHITE
BY Cook & Robinson
ATTORNEY Patented Feb. 22, 1938

2,108,999

UNITED STATES PATENT OFFICE 2,108,999

MIXING MACHINE

Leslie J. Sisley and Frank J. White, Seattle, Wash., assignors to Fisher Flouring Mills Co., a corporation of Washington Application June 4, 1935, Serial No. 24,864

5 Claims. (Cl. 259—11)

This invention relates to improvements in mixing machines, and it has reference particularly to machines designed for the mixing of a plurality of ingredients in predetermined amounts; it being the principal object of this invention to provide a machine particularly for the mixing of a special biscuit flour: however, it is to be understood that the machine is adapted also for the preparation of other products which might in their preparations, require that a plurality of ingredients be thoroughly and intimately mixed together.

More specifically stated the object of the present invention resides in the provision of a mixing machine comprising a container into which flour, in a definite amount by weight, may be received from a source of supply prior to the mixing operation; a batch mixer including a pair of revolving drums; a conveyor on which the flour may be conveyed in a layer of definite thickness from the container to the batch mixer; and conveyers whereby the various other dry ingredients that are to be employed may be delivered gradually and evenly onto the layer of flour as it is conveyed to the batch mixture.

It is also an object of the invention to provide driving means for the flour conveyer and for the other conveyers including a timing means whereby the actions of the latter are timed with the delivery of flour.

It is also an object of this invention to provide a novel form of batch mixer, especially designed for the mixing of a shortening material, such as lard, or the like, with the dry mixed ingredients, and whereby the shortening will be finely divided, and evenly and thoroughly mixed with the dry mixture in a minimum length of time.

Other objects of the invention reside in the details of construction and in the combination of parts embodied in the mixer and in their mode of operation, as will hereinafter be fully described.

In accomplishing these and other objects of the invention, I have provided the improved details of construction, the preferred forms of which are illustrated in the accompanying drawings, wherein—

Fig. 1 is a side elevation of a mixing device embodied by the present invention.

Fig. 2 is a fragmental, detail of the flour feeder valve, and its driving gearing.

Fig. 3 is a cross sectional view of the feeder valve on the line 3—3 in Fig. 2.

Fig. 4 is a longitudinal section in a vertical plane, through the flour weighing receptacle and conveyor belt whereby the flour is conveyed to the batch mixer; also showing the several conveyers whereby the dry ingredients are delivered from their respective compartments for mixing with the flour in its delivery to the batch mixer.

Fig. 5 is a sectional view on line 5—5 in Fig. 4, showing the belt driving gearing and control devices.

Fig. 6 is a cross section, as on the line 6—6 in Fig. 5.

Fig. 7 is a vertical, cross sectional view of the batch mixer.

Fig. 8 is a section in a vertical plane, axially of one of the mixing drums and its housing.

Fig. 9 is a detail of the latch mechanism for supporting the delivery doors of the batch mixer in closed position during the mixing operations.

Fig. 10 shows, in plan view, the actuating shafts for latch devices and their operating connections.

Fig. 11 is an end elevation of the upper unit of the mechanism.

Fig. 12 is a side view of the driving gearing.

Fig. 13 is a detail of the timing clutch mechanism.

Fig. 14 is a sectional detail of the clutch devices.

Referring more in detail to the drawings:

In the preparation of the biscuit flour, for which the present machine is particularly intended, a definite amount of white flour of a selected grade is first delivered into a weighing bin, or container. Then this definite amount of flour is delivered from the container on a moving belt, in a layer of definite thickness, and while being conveyed to a batch mixer the other dry ingredients for the mixture are added to the flour. The flour, with the added ingredients, is discharged into the batch mixer for a thorough mixing. Finally the mixed batch is discharged into a hopper for conveyance to the packing machines, or to other points of use.

When a shortening material, such as lard, is to comprise a part of the mixture, this is added to the dry ingredients as they enter the batch mixer, and is thoroughly mixed with the latter in the batch mixer.

To facilitate and expedite the accurate weighing out of the flour for each batch, the container 1 is mounted directly upon the weighing platform 2 of a suitable type of scale 3. In the present instance a pair of horizontal and parallel beams 4 are fixed upon the scale platform 2 and upon these beams the container 1 is mounted.

The beams are extended beyond one side of the container and also beyond the scale platform, as seen in Fig. 1, and mounted upon their extended ends is a housing 5 which, if desired, may be formed integral with the container 1, and which, at its outer end, is provided with a downwardly directed delivery portion 6 through which the ingredients are discharged directly into the receiving spout of the batch mixer 7, as will presently be explained.

The upper end of the container, or bin, 1, is open, as shown in Fig. 4, for the reception of flour from a source of supply and extended across the lower end of the bin, as a closure therefor, and continuing along the housing 5 to near its outer end, is a horizontally disposed conveyer belt 8. This belt is mounted on rollers 9 and 10 which have their shafts 9' and 10', respectively, revolubly mounted at their ends in bearings 12 on the beams 4. The outer end of belt 8 terminates at the discharge spout 6 so that the flour and other ingredients conveyed on the belt may be discharged directly into the hopper. The bin 1 has a lateral outlet 13 through which the belt passes and this is fitted with a vertically slidable closure panel 14 whereby the thickness of the layer of flour delivered by the belt may be varied as desired by adjusting the panel toward or from the upper run of the belt. To accomplish this adjustment, the panel has a horizontal cross bar 15 fixed thereto, as shown in Fig. 11, and this bar has lugs 15 fixed to its opposite ends through which vertical adjusting shafts 16 are threaded. These threaded shafts are revolubly contained at their upper and lower ends, respectively in supports 17 and 17' that are fixed to the bin 1. Fixed on the lower end of each shaft is a bevel gear 19 meshing with bevel gears 19' on a cross shaft 20, supported revolubly in bearings 21 fixed to the bin 1. The adjusting shaft 20 extends to one side of the housing and is equipped with a wheel 20' whereby it may be rotated thereby to simultaneously rotate the shafts 16 to raise or lower the closure panel 14.

Directly above the bin is a supply hopper 22 provided with a delivery opening 23 in which is fitted a revolubly mounted feed valve 24. This valve, as shown in Figs. 2 and 3, has a supporting shaft 25 revoluble at one end in a supporting bearing 26, and fixed on the shaft is a worm wheel 27 driven by a worm 28 on the shaft 29 of an electric motor 30. The valve has pockets 31, lengthwise thereof whereby the flour is delivered in a controlled amount as the valve rotates. A hood 32 suspended from the hopper 22 and free of the bin 1 encloses the open upper end of the bin 1 and the delivery mouth 23 of the hopper to confine the fine flour therein.

When the motor 30 is set in motion, flour will be delivered into the container 1 by rotation of valve 24, and by watching the balance arm of the scale 3, the operator may effect the delivery of the exact amount of flour desired, or required, for any particular batch.

The motor 30 is mounted on a supporting bracket 33 attached to the hopper 22 and could, if desired, have a suitable control switch in its circuit actuated by the balance arm of the scale to automatically open the circuit to stop the motor 30 when a definite amount of flour had been delivered into the bin 1.

Supported free of the container 1 and housing 5 by means of an independent frame structure 35, is a housing 36, of rectangular form and horizontally disposed over the housing 5. This housing 36 is transversely divided, as shown in Figs. 4 and 5, by partitions 37 to provide a plurality of transverse compartments or bins 38, 38a, 38b, etc., to a desired number; there being six of these compartments shown in Fig. 4.

Across the lower, open ends of the several compartments, feed belts 40 operate. Each belt closes the bottom of its respective compartment and has individual mounting rollers 41 and 42 and these have their mounting shafts 43 revolubly supported in bearings 44 in the opposite side walls of the housing 36 and the forward rollers of each set are mechanically driven, as presently described, thus to move the belts for feeding of material from the compartment.

At one side of each compartment thus provided is a discharge slot 45 just above the top run of the belt associated therewith. Each slot is equipped with a closure in the form of a panel 46 that may be adjusted relative to the belt to control the area of the space for outflow of material. Thus, when a material such as salt, soda, or the like, is placed in a compartment 38, it will, on operation of the belt, be gradually fed therefrom by the belt 40 and will be discharged downwardly into the housing 5 for delivery onto the mixing drum 7.

Assuming that a weighed quantity of flour has been deposited in the bin 1, the belt 8, when set in motion, will convey this flour in a layer of definite thickness, as determined by the setting of panel 14, through the housing 5 and will discharge it into the batch mixer. Coincident with this delivery of flour, all belts 40 are caused to operate to deliver the ingredients of the various bins 38 onto the layer of flour or directly into the hopper 6, thereby to pre-mix them before delivery into the batch mixer.

If it should be desired to shut off the delivery of flour from the bin at any time, this is accomplished by the closing of a door 47 over the opening 13. This door, as shown in Fig. 4, is fixed on a cross shaft 48, revoluble in supporting bearings 49, fixed to the forward side of the housing; this shaft is equipped at one end with a hand lever 50, whereby it may be rotated to swing the door between open and closed positions. A latch 51 of common design, is associated with the lever, and is adapted to engage a stationary rack segment 52 to hold the door at any set position.

Access to the outer end of housing 5 is provided through an opening 55, as shown in Fig. 4. A door 56 is hingedly suspended inside the housing to overlie this opening and this operates as a deflector plate by which material discharged from the outer bins 38, is directed into the hopper 6. Also, this opening 55 is that through which the shortening material is applied for mixing with the dry mixed ingredients, and it serves as a breather opening for exhaust of air from the mixer incident to its being charged with a batch.

The batch mixer 7, as shown best in Figs. 7 and 8, comprises a closed housing having two parallel cylindrical sections 7a and 7b, adapted to receive material thereinto through a common top opening from the hopper 6. Each section coaxially contains a revolubly mounted drum 60. Each drum has a supporting shaft 61 extended revolubly through bearings in frame structures at the ends of the housing, and these shafts are equipped with belt wheels 62 about which belts 63 operate to revolubly drive the drums in the direction indicated by the arrows thereon in Fig. 7.

Each drum comprises opposite ends of circular form joined directly across their outer edges by tightly drawn wires or rods 64. These rods are in two concentric circular rows and operate to divide and cut the materials to effect a thorough mixing. They also operate to cut up the shortening material.

Each section of the housing also has a delivery opening 65 at its lower side communicating with a discharge hopper 66. Doors 67 are arranged to close these openings and, as shown in Fig. 7, are fixed to and supported by transverse shafts 68—68. These shafts extend to the outside of the housing 7 and each has a gear segment 70 fixed thereon, as seen in Fig. 1. A rack bar 71, slidable in guiding supports 72 meshes with the gear segments and this rack is shiftable by means of an oscillating lever arm 73, pivoted as at 74 on the housing, and provided with a pin and slot connection, as at 75, with the rack bar. A pneumatic means actuates the lever arm in opposite directions, thus to open or close the doors. This hydraulic means comprises a cylinder 80, containing a piston 81 therein with a rod 82 connected by link 83 with the oscillating lever arm 73. Admittance of pressure medium to one or the other end of the cylinder, actuates the piston accordingly, thus to open or close both doors simultaneously.

When the doors are closed, they may be locked in this position by latches 90, which are fixed on pivot shafts 91 that extend through the housing, as seen in Figs. 9 and 10. These two shafts have intermeshing gear wheels 95—95 at their outer ends of like size, see Fig. 10, thereby to cause said shafts to operate together and an actuating arm 96 is attached to the outer end of one shaft, as seen in Figs. 1 and 10, whereby the two may be rotated to cause all latches to simultaneously engage or release their respective doors. The arm 96, is connected by a link 97 with a piston 98 in an air cylinder 99. The cylinder is connected with a source of compressed air by a pipe 100 and a control valve 101 is operable to admit air to either end of the cylinder to actuate the piston either to lock or unlock the doors 65.

The mixed batch is discharged, by opening of the doors 65 into the hopper 66 and the material is conveyed from the hopper on a belt 106 operating through the hopper across the bottom wall thereof, as shown in Fig. 8.

The driving gearing for the machine is shown best in Figs. 5, 6, 11, 12 and 13 wherein 110 designates the main shaft that is continuously driven by connection with a motor 112. As shown in Fig. 12, the motor has a worm 113 driving a worm wheel 114 to effect a desired speed reduction, and wheel 114 is fixed on a supporting shaft 115 carrying a sprocket wheel 116 over which a belt 117 operates to drive a sprocket 118 fixed on shaft 110. A driving connection between the shaft 110 and the shaft 9' is made through a clutch 120, as seen in Fig. 6, and the setting of this clutch is through manipulation of the shaft 48. By reference to Figs. 5, 11 and 12 it is observed that on the end of shaft 48 is a lever arm 121, connected at its outer end by a link 122 with a pivotally mounted clutch shifting bell crank lever 123, as seen in Fig. 5. The connection provides that, when the shaft 48 is rotated to open the gate or door 47, it operates, also to rock the bell crank and thereby to set the clutch 120 and cause the belt 8 to be set in motion. When the door 47 is moved to closed position, this disengages the clutch and stops the belt 8; the bell crank when rocked operates to shift one part along shaft 9' into or from locked relation with the complementary part which is fixed on shaft 110.

By reference to Fig. 5, it will be seen that the rolls 41 for the feed belts 40 have their drive shafts extended to the side of housing 36 and each is equipped with a bevel gear 125 whereby it is driven. These gears are in mesh with bevel gears 126 on a longitudinal shaft 127 which, in turn has a gear 128 at one end meshing with a gear 129 on a shaft 130. The shaft 130, as seen in Fig. 13, is coaxial of a driving shaft 131 driven by a sprocket chain belt 132 operating about sprocket wheels 133 and 134 on the shafts 110 and 131, respectively. A clutch mechanism 135, later described, is arranged to effect or to release a driving connection between the shafts 130 and 131.

Directly below shaft 131 and parallel therewith is a shaft 138. This has a driving gear 139 keyed to its end and driven by a relatively small gear 140 on the end of shaft 131. Coaxially alined with the shaft 138 is a shaft 142. These shafts are operatively connected through the mediacy of a clutch device designated at 143. This latter clutch is under control of a release lug 144 fixed on a shift rod 145 that is reciprocally actuated between clutch setting and releasing positions by a lever 146 supported by a pivot 147 intermediate its ends, with its lower end operatively connected by means of linkage designated at 148, see Figs. 5 and 12, with the clutch setting bell crank 123 in such manner that when clutch 120 is set to drive the belt 8, it also effects the movement of shift rod 145 whereby clutch 143 is set to drive the shaft 142.

Fixed on shaft 142 is a cam segment 155 that controls the setting and release of clutch 135. Clutch 135 is illustrated in Fig. 14 and its illustration applies also to clutch 143. In Fig. 14, 160 designates a ratchet wheel fixed on shaft 138 and 161 is a pawl, pivotally mounted at 162, on a casing 163 fixed on shaft 142. The pawl has an end portion 161a extended beyond the housing to a position to engage with the block 144, thereby to release the clutch. When the shift rod 145 is adjusted outwardly, the pawl will be released, thus setting the clutch.

When the clutch 143 is set, it rotates shaft 142 which, in turn, rotates the cam segment 155. This segment is operable to set or release the clutch 135 in a like manner.

When the machine is in operation, the shafts 110 and 131 are continuously driven. When clutch 120 is set, it starts the flour delivery belt 8 moving. Also, coincident with setting of clutch 120, the shift rod 145 is moved to set clutch 143, and this starts cam segment 144 rotating, but due to the extent of the cam, the clutch 135 is not released until some time after belt 8 has started and this interval of time is such that the layer of flour will have reached the end of the belt before the ingredients in the compartments 38 are released. This is desirable since the heavier ingredients, if not mixed with the flour prior to delivery into the batch mixer will not mix in the latter.

The clutch arrangement is so arranged also that after release of clutch 120 to stop the belt 8, the shaft 142 continues to rotate until clutch 143 is released, and this is coincident with or closely following the release of clutch 135.

With the machine so constructed, batches of material may be quickly and thoroughly mixed; first by applying the other ingredients to the flour as the latter is delivered in a layer of a desired thickness on the belt 8, then mixing all together in the revolving drums. The shortening material may be added to the mixture in the drums, and there thoroughly ground up.

Having thus described our invention, what we claim as new therein and desire to secure by Letters Patent is—

1. In a machine of the character described, a storage bin for a batch of flour, or the like, having a side opening, a continuous belt supporting the flour in the bin and operating through the side opening thereof for conveying the flour from the bin in a layer thereon to a point of delivery, a plurality of separate compartments arranged in succession along the belt and having individual dispensing means operable to deliver materials therefrom in successive layers onto the layer of flour as conveyed by the belt, and means for driving the first mentioned belt and for actuating the said dispensing means in synchronism therewith and for causing a time delay between the starting of the first mentioned belt and the dispensing means for the separate compartments.

2. In a storage bin for flour or the like having an opening, a belt operating through the opening for conveying flour from the bin in a layer thereon to a point of delivery, a compartment spaced from the bin above the belt and having means for the dispensing of material therefrom onto the layer of flour, a mechanism for driving the belt and for actuating the dispensing means, and including devices whereby there will be a time delay effected between the starting of the belt for delivery of flour and the starting of said dispensing means.

3. A machine of the character described, comprising a bin adapted for reception of a batch of flour and having a laterally extending housing and a side wall opening communicating with the housing, a continuous horizontal conveyor belt operable about driven rollers located in the bin and housing, respectively, and on which belt flour will be delivered from the bin, a panel mounted across the top edge of said side wall opening and adjustable from and toward the belt to determine the thickness of the layer of flour delivered by the belt, means for closing off the opening, a plurality of ingredient compartments supported across the laterally extending housing at intervals along the travel of the belt and a discharge belt for each compartment operable to dispense the contents thereof onto the layer of flour as delivered on the belt.

4. In a machine of the character described, a bin for the reception of a batch of flour and having a laterally extending housing and a side wall opening into the said housing, a continuous belt operable through the bin as a support for the flour therein and through said side wall opening and spaced from the top of the opening for the conveyance of flour from the bin thereon in a layer determined by the spacing of the belt below the top of the opening, ingredient compartments arranged above the belt in said housing and equipped with means for the dispensing of ingredients therefrom in layers onto the layer of flour, and a door adapted to be closed over the opening of said bin and against the top of the belt to cut off the conveyance of flour thereon from the bin.

5. A device as in claim 4, wherein there is a power driven shaft, a driving shaft for the conveyer belt, a clutch connection between the shafts, and means operable incident to opening said door to set the clutch for driving the conveyer belt and for releasing the clutch upon closing of the door.

LESLIE J. SISLEY.
FRANK J. WHITE.